Nov. 15, 1927.  1,649,31'

G. E. MOLYNEUX

APPARATUS FOR HANDLING CLOTH BLANKS AND THE LIKE

Original Filed Aug. 28, 1917    8 Sheets-Sheet 8

INVENTOR
George E. Molyneux
BY
Redding Greeley Goodlett
ATTORNEYS

Patented Nov. 15, 1927.

1,649,319

UNITED STATES PATENT OFFICE.

GEORGE E. MOLYNEUX, OF BAYONNE, NEW JERSEY, ASSIGNOR TO UNITED SHOE MACHINERY CORPORATION, OF PATERSON, NEW JERSEY, A CORPORATION OF NEW JERSEY.

APPARATUS FOR HANDLING CLOTH BLANKS AND THE LIKE.

Application filed August 28, 1917, Serial No. 188,589. Renewed September 1, 1923.

This invention has for its object to provide automatic means for the handling or placing, with a view to subsequent operations thereon, articles which must be handled or placed successively in large numbers but cannot well be handled and placed by means such as can be employed to advantage with articles of a different character. The invention has been developed with particular reference to its use in handling or placing the parts of shoe linings of cloth or leather so that they may be assembled and secured together either by stitching or by cementing or otherwise. It is illustrated and explained herein with reference to its embodiment in a mechanism for taking from one container a half of a cloth lining for a shoe and from another container a facing strip, assembling the half lining and the facing strip in proper relation and holding them in such relation during the operation of the stitching mechanism by which they are secured together. It will be obvious, however, that the same or similar units of mechanism might be employed for taking out of containers, assembling and stitching together the two half linings or the complete lining and the top facing, or any other parts of a shoe lining or of other articles of a like general nature. For the purpose of further explaining the nature of the invention it may be stated that the usual procedure in sewing together for example, a half of a shoe lining and its facing strip has been as follows: The half linings and the facing strips, previously cut out, are tied up in separate bundles and delivered to the operator who is to stitch them together. The operator first counts the number of half linings and the number of facing strips to be sure that the proper number of each has been delivered and then, taking a half lining and a facing strip from the respective bundles, lays the facing strip upon the half lining in a position as nearly correct as can be determined by the eye alone and then, holding the two together with the fingers, passes them to the sewing mechanism. Not only is considerable time consumed in these successive hand operations, but there is great liability of failure to place the facing strip upon the lining with the required accuracy, or to hold the two in exact relation during the stitching operation. It is the object of this invention to provide apparatus by which all of these operations, heretofore usually performed by hand, can be performed automatically, not only with a great saving in time but with absolute accuracy in every instance. In the embodiment of the invention chosen for illustration the linings and facings or blanks are placed in the apparatus in suitable containers in which they are fed upward as the uppermost blank is removed. Vacuum fingers mounted upon a suitable carrier pick up the uppermost blank, a film of air being introduced between the topmost blank and the next below it for the purpose of freeing the topmost blank. The carrier then moves to a predetermined position where the blank is released and clamped in position to be operated upon. The facing strip is picked up in the same manner and is placed in position on the lining blank and is then clamped in position in readiness to be stitched thereto. Blanks of different forms or other articles can be handled in like manner, with such adjustment or variation in details of the apparatus as may be necessary to meet the special requirements of each case.

In the drawings, wherein is illustrated the chosen embodiment of the invention—

Figure 8:
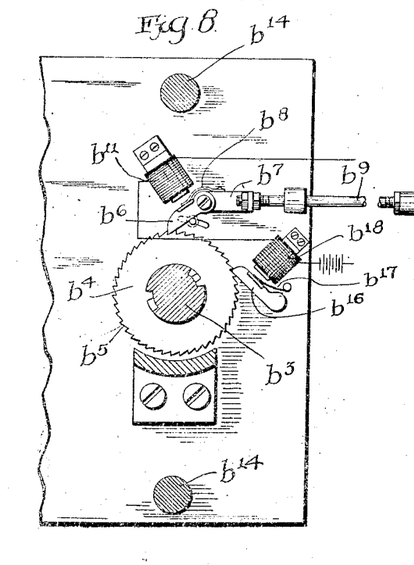
Figure 8 is a detail view in horizontal section of the feed mechanism for the blanks.

In the embodiment of the invention illustrated in the drawings a quantity of half linings $a$ of cloth for the uppers of shoes, previously cut out, is placed in a receptacle $b$, which preferably conforms substantially to the shape of the blank or half lining, and a like quantity of blanks or facing strips $c$ of soft leather is placed in a receptacle or container $d$. Both containers are supported with their upper edges flush with the surface of the machine table $e$, as clearly shown in Figure 14, the receptacle $b$ having a flange $b'$ which rests upon the support $e'$ secured to the underside of the table top. The container $d$ is preferably placed with respect to the container $b$ so that each facing strip $c$ can be placed by a parallel movement in position on the edge of the corresponding half lining $a$. The bottom $b^2$ of the container $b$ (the bottom of the container $d$ being similarly arranged) is movable upward with a step-by-step motion so as to present the topmost blank of the pile therein at substantially the same height after it has been uncovered by the removal of the one above it. The bottom plate $b^2$ is carried by a vertical screw $b^3$, of steep pitch, which is mounted in a rotatable nut $b^4$. The latter is supported on the frame of the machine and has a circular, toothed periphery $b^5$ for engagement by an actuating pawl $b^6$ (see Fig. 8) which is pivoted upon a reciprocating carrier $b^7$ and is pressed by a light spring $b^8$ into contact with the toothed periphery $b^5$ of the nut $b^4$. The carrier $b^7$ is reciprocated through an eccentric rod $b^9$ from an eccentric $b^{10}$ on the main shaft of the machine. An electromagnet $b^{11}$ is mounted in proximity to the pawl $b^6$ and is in circuit, through a source of current, with the movable bottom $b^2$ of the container $b$, which has a contact point $b^{12}$, and with a contact finger $b^{13}$ secured to the table $e$, so that when the last blank $a$ has been removed from the container and the bottom $b^2$ has been raised to the limit of its upward movement, the circuit will be closed through the magnet $b^{11}$ and the pawl $b^6$ will be withdrawn from engagement with the toothed nut $b^4$, thereby permitting the steep-pitch screw $b^3$ to be rotated backwards under the weight of the container bottom and its connected parts and the bottom to fall to its lowest point. Guide rods $b^{14}$ are provided for the movable bottom $b^2$. The bottom of the container $d$ is moved with the bottom of the container $b$, being connected therewith by a guiding yoke $b^{15}$, as clearly shown in Figure 2. Reverse movement of the nut $b^4$, during the feeding operation, is prevented by a hold pawl $b^{16}$, pressed by a spring $b^{17}$, and adapted to be disengaged, when the container is empty, by an electromagnet $b^{18}$ in series with the magnet $b^{11}$. The blanks of two kinds thus fed are put together, so that the topmost blank in each pile is presented at the level of the table top when the blank above it has been removed. The carrier which supports the pick-up fingers of the apparatus receives its motion to lift the fingers and the topmost blank picked up thereby as well as its motion to transport the blank to the predetermined position in which it is clamped during the operation to be performed thereon, from a main shaft $f$ which is mounted longitudinally in suitable bearings in the frame of the apparatus. As already described it has secured thereon the eccentric $b^{11}$ which operates the feeding devices for the blanks. It has also secured thereon a cam $f'$ which is embraced by a fork $f^2$ secured to a rock shaft $g$, mounted in suitable bearings on the frame. The latter has keyed thereon, so as to rock therewith and to be free to move longitudinally, a carrier sleeve $g'$ which is caused to reciprocate on the rock shaft by engagement with an arm $g^2$, pivoted on the frame at $g^3$ and having a pin $g^4$ which enters a cam groove $g^5$ of a face cam $g^6$. The latter is driven through a skew gear $g^7$ from a corresponding gear $b^8$ on the main shaft $f$. The carrier sleeve $g'$ is provided with arms $g^9$ which support the pick-up fingers to be referred to. The sleeve $g'$ is rocked by the described means so as to raise the pick-up fingers, holding the top blank, from the position shown in Figures 1, 2 and 3 and the carrier is then actuated by the described means to transport the blank from the position shown in full lines at the left hand portion of Figure 1 to the position shown by dotted lines at the right hand portion of Figure 1, where the blank is released and clamped in position for further operation.

The picking up of each blank is effected by what may be called vacuum fingers, that is vacuum tubes $h$ carried by the arms $g^9$, so as to move therewith, and connected by a flexible tube $h'$ through a valve $h^2$ to the vacuum system indicated by the pipe $h^3$.

Figure 2:
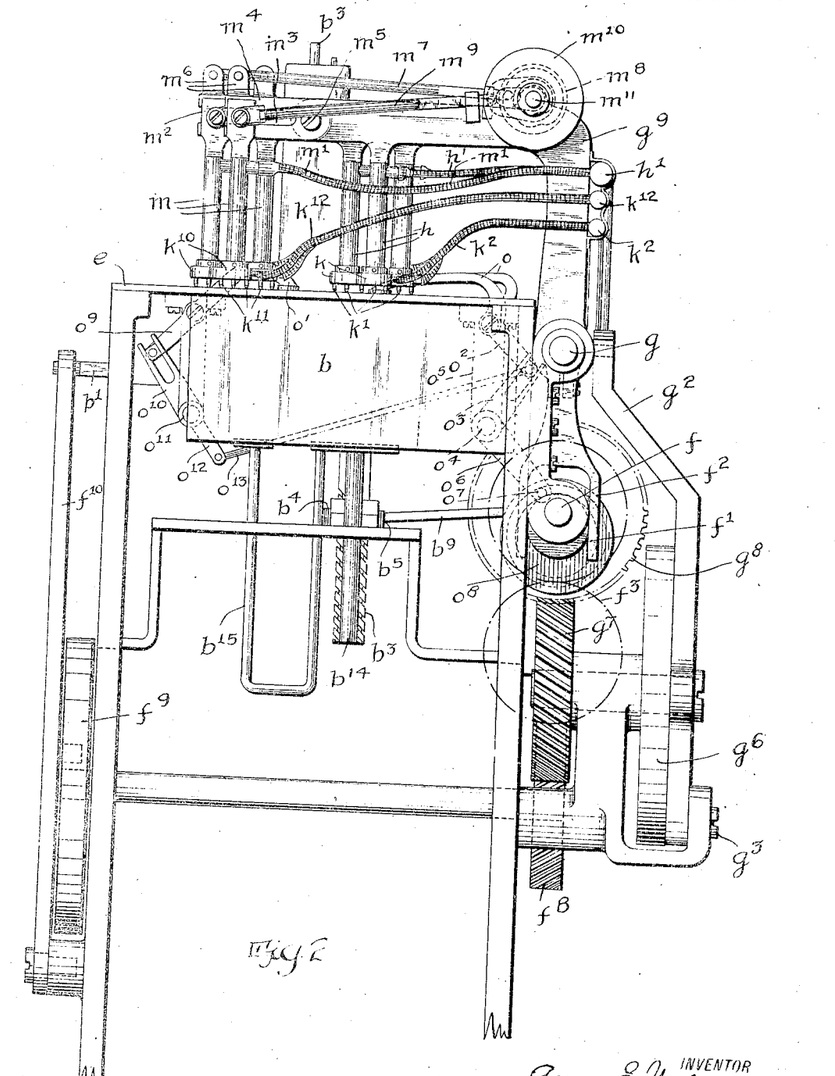
Figure 2 is a view of the same in end elevation, as seen from the left hand in Figure 1.
Figure 3:
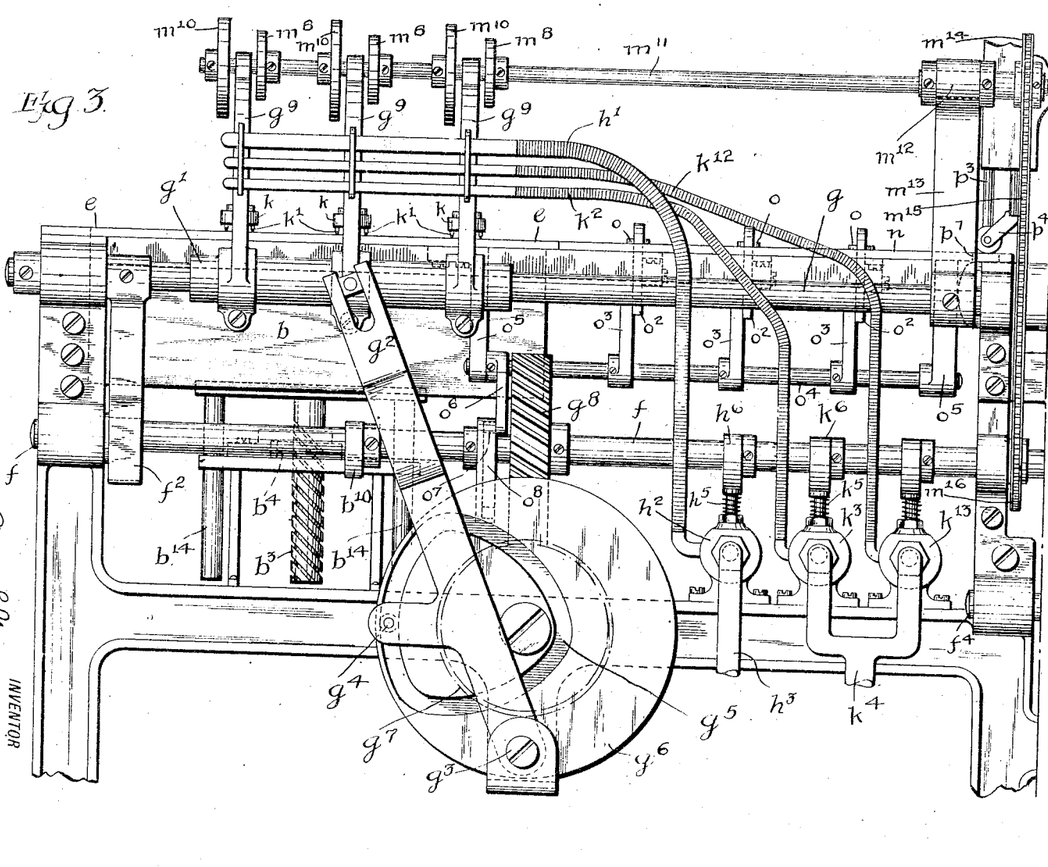
Figure 3 is a view of the same in side elevation, as seen from the right hand in Figure 2.
Figures 10, 11, 12, 13, 14:
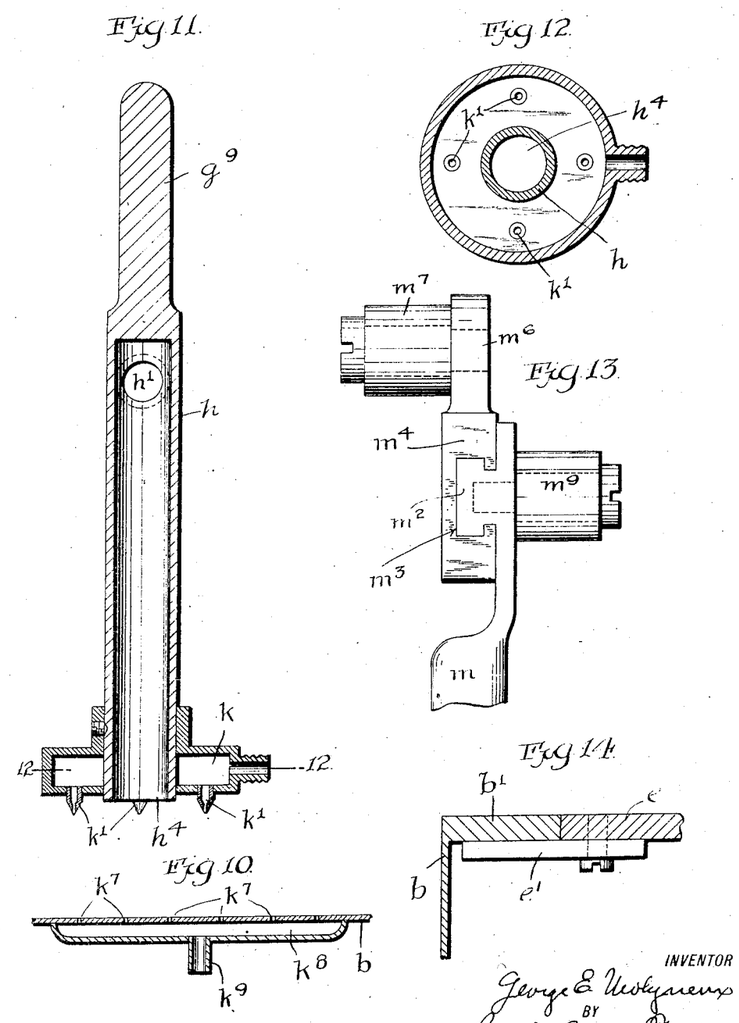
Figure 10 is a detail view in horizontal section through the device shown in Figure 9 for introducing a film of air.
Figure 11 is a detail view in vertical section of one of the vacuum pick-up fingers shown in Figures 1, 2 and 3.
Figure 12 is a detail view in section on the plane indicated by the broken line 12—12 of Figure 11.
Figure 13 is a detail view, on a larger scale, of a portion of the pick-up devices for the facing strip shown in Figure 1.
Figure 14 is a detail view illustrating the support of a blank container.

As shown in Figures 2 and 11, each vacuum terminal or pick-up finger $h$ is carried by a corresponding arm $q^9$ and has an open lower end $h^4$. There may be one or several tubes $h$ and arms $q^9$ mounted on the carrier $g'$ according to the shape and size of the blank or other article to be handled. The valve $h^2$, spring actuated to close, as indicated at $h^5$ in Figure 3, is under the control, for opening, of a cam $h^6$ on the main shaft $f$. When the carrier $g'$ is rocked on the shaft $g$ to bring the pick-up fingers $h$ down upon the topmost blank in the container, the valve $h^2$ is opened by the cam $h^6$ and is held open during the rocking of the carrier to lift the blank, the longitudinal movement of the carrier to transport the blank and the rocking of the carrier to deposit the blank. The blank is therefore held by the pick-up fingers during these movements. When, however, the blank is deposited in place the cam $h^6$ permits the valve to be closed by its spring $h^5$, thereby cutting off the communication with the vacuum system and permitting the blank to be released from the pick-up fingers.

In the handling of comparatively thin and flexible articles, like the parts of a shoe, it is desirable to facilitate the separation of the topmost blank or article, then engaged by the pick-up fingers, from the blank or article next below it. This is conveniently effected by the introduction of a film of air between the topmost blank and the next blank below it. When the article to be handled is of such a nature that small perforations are not objectionable, such as a part of a cloth lining for a shoe, the film of air to release the topmost blank may be introduced through the blank itself, but if the article is of such a nature that puncturing is undesirable, the film of air may be introduced from the edge. The pick-up fingers $h$ are shown in Figures 2, 3 and 11 as adapted for the introduction of air through the topmost blank. Each terminal $h$ is provided near its lower end with a casing or header $k$ which is armed on its underside with hollow needle points or pointed tubes $k'$ which project below the lower end of the terminal $h$ just far enough to penetrate through the topmost blank. Each casing or header $k$ is connected through tubing $k^2$ with a valve $k^3$ and with a source of air under pressure represented by the pipe $k^4$. The valve $k^3$ is spring actuated to open, as indicated at $k^5$, and is actuated to close by a cam $k^6$ on the main shaft $f$. When the pick-up finger $h$ is brought down upon the topmost blank the valve $k^3$ is opened so that as the pick-up finger is brought in contact with the topmost blank air is admitted at the same time between the topmost blank and the next one below it. The supply of air may then be cut off by the closing of the valve, which may remain closed until the pick-up finger is again brought into contact with the topmost blank for the purpose of picking it up.

Figure 9:
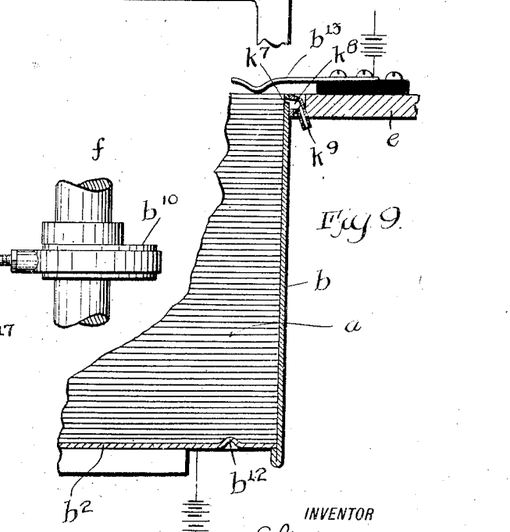
Figure 9 is a detail view in vertical section through one of the containers illustrating particularly a means for introducing a film of air between the topmast blank and the next one and the means for closing the controlling electrical circuit when the container is empty.

If it is undesirable to puncture the article in order to permit the air to be introduced through it into the space between it and the next one below, the film of air may be introduced between the two at the edge, as indicated in Figures 9 and 10. As there shown, the wall of the container may be provided, at a distance below its upper edge substantially equal to the thickness of each blank or article, with a series of small orifices $k^7$ which communicate with an external header $k^8$ which, in turn, is connected at $k^9$ with the air tube $k^2$. In this arrangement, the air, admitted by the opening of the valve $k^3$ at the proper time, flows from the edge between the topmost blank and the next one and facilitates the separation of the topmost blank without liability either of picking up the next blank or of pulling the topmost blank away from the pick-up fingers.

Thus far it has been assumed that there is but one blank to be handled, as might indeed be the case, but the apparatus shown is designed for the handling not only of a half lining for a shoe but of the facing strip which is to be secured in proper position to the half lining.

Figure 1:
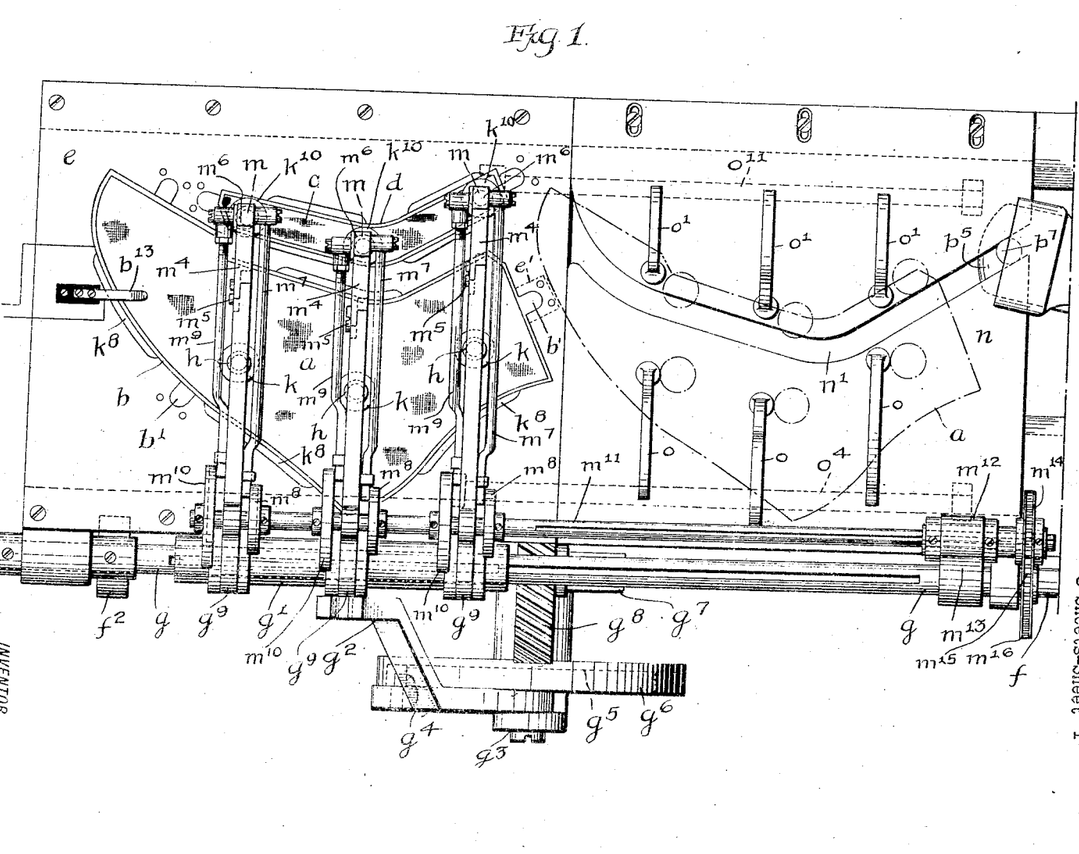
Figure 1 is a top view of the apparatus referred to, showing only a portion of the stitching mechanism which may be employed to operate on the blank.

Reference has already been made to these facing strips $c$ in the container $d$. The pick-up fingers $m$ shown in Figures 1 and 2 are constructed in the same manner as the pick-up fingers $h$ already described, and are connected by flexible tubing $m'$ with the vacuum tube $h^x$, under the control of the valve $h^2$. They are also provided with headers $k^{10}$ and hollow ends $k^{11}$ and are connected through flexible tubing $k^{12}$ and a spring opened valve $k^{13}$, with the compressed air system $k^4$, the valve $k^{13}$ being opened and closed at proper times for the handling of the blank.

As the facing strip must have a movement independent of the half lining, so as to be superimposed thereon, the pick-up fingers $m$ are so supported and actuated as to have the necessary movement. Each pick-up finger $m$ depends from a slide block $m^2$ mounted in a slide way $m^3$ which is formed in an extension $m^4$, pivoted at $m^5$ on the end of the arm $q^9$. The extension $m^4$ is provided with an upwardly extending arm $m^6$ which is operatively connected by a link $m^7$ with a pin which engages a cam groove in one face of a cam disc $m^8$. The slide block $m^2$ is also connected by a link $m^9$ with a pin which engages a cam groove in the face of a cam disc $m^{10}$. The cams $m^8$ and $m^{10}$ are mounted on a shaft $m^{11}$ supported in the arms $q^9$ and in a sleeve $m^{12}$ which is mounted with freedom for rotation in an arm $m^{13}$ secured to the shaft $g$ so as to oscillate therewith. The shaft $m^{11}$ is connected with the sleeve $m^{12}$ by a key so as to rotate therewith while being free to slide longitudinally through the same and the sleeve is operatively connected through a chain wheel $m^{14}$ and chain $m^{15}$ with a chain wheel $m^{16}$ on the shaft $f$.

The gearing of the shaft $m^{11}$ and the several cams and their connections are so related that just before the pick-up fingers $h$ lift the topmost blank $a$ from the container $b$, the pick-up fingers $m$ will be caused by the cams $m^8$ and links $m^7$ to swing about the pivotal axis $m^5$ of the arm extensions $m^4$, so as to lift the topmost blank $c$ from the container $d$. Thereafter the slide blocks $m^2$ will be moved by the cams $m^{10}$ and links $m^9$ to draw the pick-up fingers $m$ toward the pick-up fingers $h$. Eventually the cams $m^8$ will operate again to cause the blank $c$ to be laid upon the blank $a$. Meanwhile the carrier $g'$ is rocked so as to lift the pick-up fingers $h$ as well as the pick-up fingers $m$, and is then moved longitudinally to transport both blanks together toward the right hand portion of the machine shown in Figure 1 and eventually is rocked again to deposit the two blanks together upon the work table $n$, where the next operation, whatever it may be, is to be performed upon the blanks so deposited, which is, in this case, the sewing of the facing strip on the half lining. During this operation it is desirable that the blanks be clamped firmly in position and for this purpose are provided the clamps $o$ and $o'$ which, with their operating mechanism, are shown in Figures 1, 2 and 3. The clamping arms $o$ are extended downward through the work table $n$ and are pivotally mounted on the underside of the same, each clamp arm having extended therefrom on the other side of its pivot an arm $o^2$. The latter is engaged by a corresponding forked arm $o^3$ fixed on a shaft $o^4$, which is mounted in suitable brackets $o^5$. An arm $o^6$ fixed on the shaft $o^4$ carries a pin $o^7$ which engages a cam groove in a face cam $o^8$ on the shaft $f$.

The clamp arms $o'$ are likewise extended through the work table $n$ and pivotally mounted on the underside thereof, each having an extended arm $o^9$ which is engaged by a corresponding forked arm $o^{10}$ on a shaft $o^{11}$. An arm $o^{12}$ fixed to the shaft $o^{11}$ is connected by a link $o^{13}$ with the arm $o^2$, so that the two sides of the clamp arms $o$ and $o'$ are operated together.

When the blanks are being picked up and transported to the work table the clamp arms are swung back out of the way, but when the blanks have been deposited on the work table the clamp arms are swung forward to hold the blanks firmly in position on the work table, with the facing strip in position on the half lining in readiness for the next operation.

So far as the handling or placing of the blanks is concerned, the precise nature of the operation to be performed on the blank or blanks when placed is immaterial. As already suggested, however, the apparatus which has been chosen for illustration of the invention is designed for the sewing of the facing strip on the lining. As an example of mechanism to perform an operation on an article handled or placed by the handling or placing apparatus, a sewing mechanism, suitable for the purpose, therefore will now be described. Such sewing mechanism is shown in Figures 4, 5, 6 and 7 as a continuation of the handling or placing apparatus and as a part of the same machine, being subject also to automatic control by the blanks handled and being stopped when the supply of blanks is exhausted. The main shaft $f$, through gears $f^3$, receives motion from a driving shaft $f^4$ which is provided with a fast pulley $f^5$ and a loose pulley $f^6$. Through a skew gear $f^7$ and a corresponding gear $f^8$ it drives a grooved face cam $f^9$ which, through a co-operating lever $f^{10}$, forked $f^{11}$, produces the longitudinal, reciprocating traverse of a slide block $p$, the slide block being provided with a finger $p'$ engaged by the fork $f^{11}$ of the lever $f^{10}$. Mounted upon the slide block $p$, so as to swing freely thereon about a vertical axis, is the usual arm $p^2$ of a sewing machine, in which is mounted the usual needle bar $p^3$, with its actuating mechanism, and the presser $p^4$.

The lower horizontal arm $p^5$ carries the usual looper mechanism $p^6$, with its actuating devices, and is provided at its end with a stud or roller $p^7$ adapted to travel in the slot $n'$ in the work table $n$. This slot conforms to the line on which the stitching of the facing strip to the lining is to be done and therefore compels the needle of the sewing mechanism to follow the desired line as the sewing mechanism is transversed to and fro in the guide way $q'$ formed in the table $q$.

As the sewing mechanism swings about a vertical axis its driving shaft $r$ is arranged vertically in the same axis, transmitting motion through gears $r'$ to the main shaft $p^8$ of the sewing mechanism. The shaft $r$ receives its motion through bevel gears $r^2$, $r^3$, the latter having a grooved hub $r^4$ engaged by a fork $r^5$ which is secured to the slide block p. The gear $r^3$ is keyed on its shaft $r^6$ so as to slide thereon, to accommodate the movements of the sewing head while turning therewith. The shaft $r^6$ is driven from the shaft $f^4$ by a suitable transmitting mechanism, such as a cord and pulleys, indicated at $r^7$, an electromagnetic clutch $r^8$, of usual construction, preferably being interposed in the driving mechanism.

Figure 4:
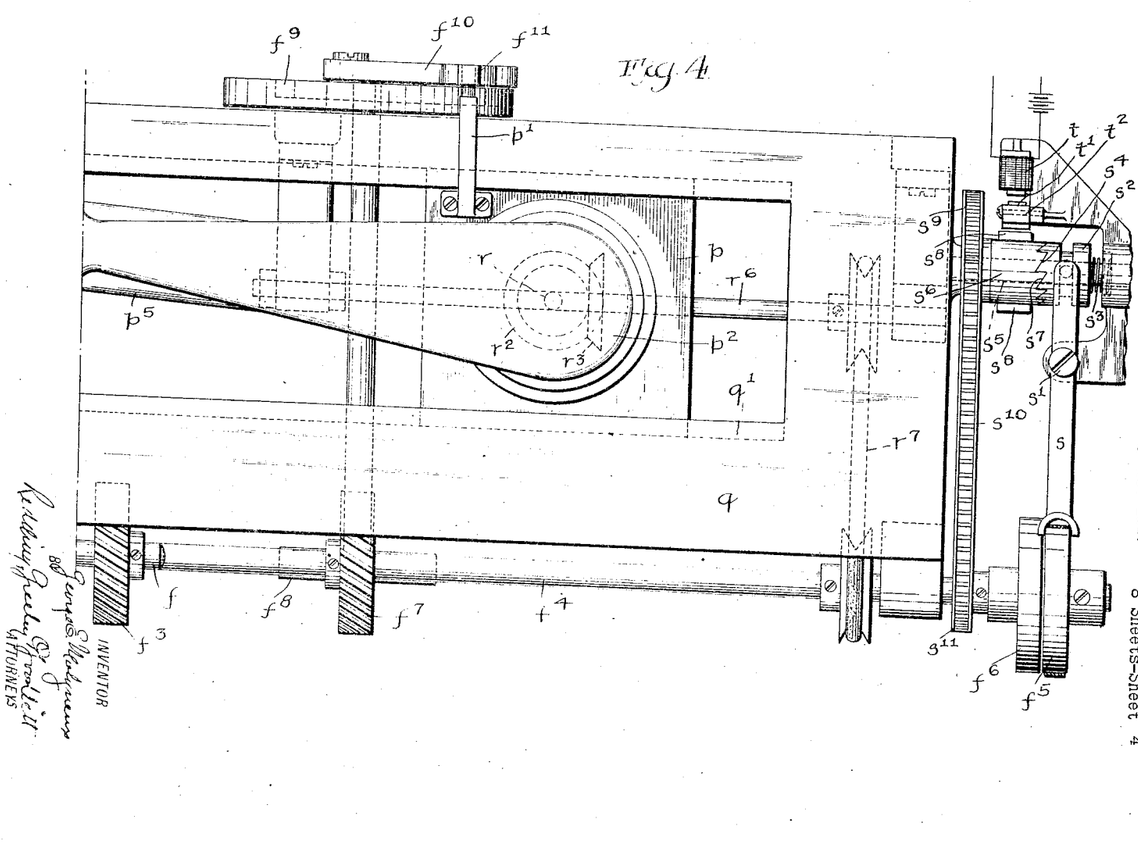
Figure 4 is a top view of a continuation of the machine shown in Figure 1, showing particularly the stitching mechanism and some of the controlling devices.
Figure 5:
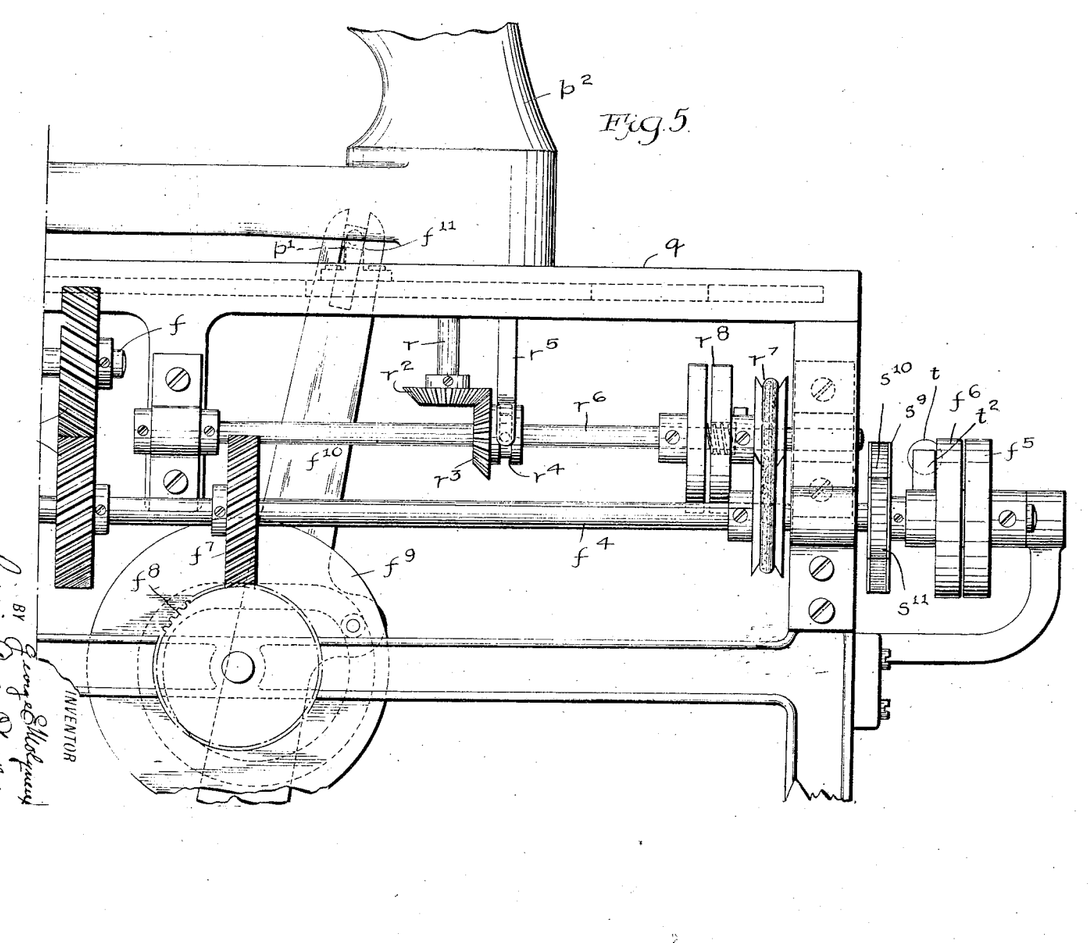
Figure 5 is a view in side elevation of the mechanism shown in Figure 4 with the arm of the stitching mechanism broken off.
Figure 6:
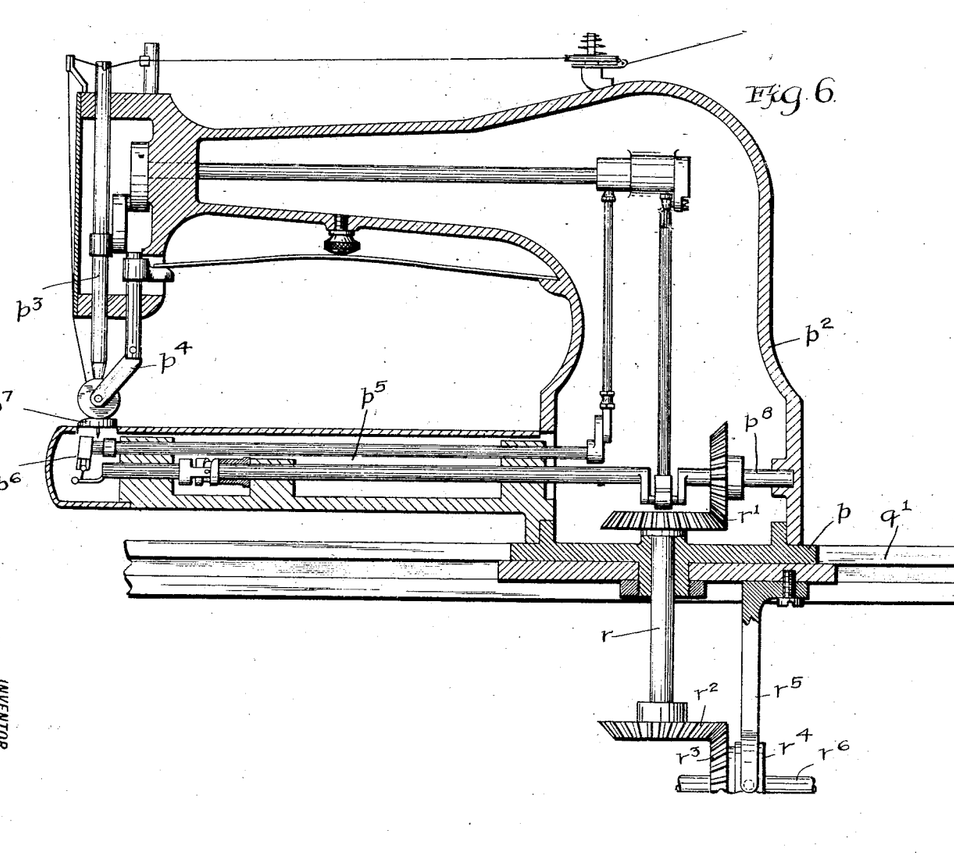
Figure 6 is a view of the stitching mechanism in vertical section, on a somewhat smaller scale than that of Figures 4 and 5.
Figure 7:
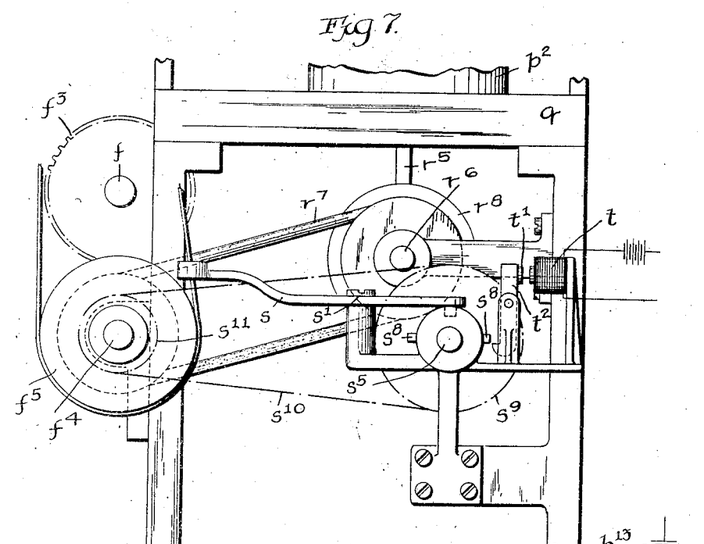
Figure 7 is a partial view in end elevation of the mechanism shown in Figure 5, as seen from the right hand in said figure.

To effect the automatic stopping of the whole machine, including the handling apparatus as well as the sewing mechanism, when the supply of blanks is exhausted, a belt shipping mechanism may be provided as shown particularly in Figures 4, 5 and 7. The belt shipping lever $s$, pivoted at $s'$, engages a grooved sleeve $s^2$, pressed to the left by a spring $s^3$ and having its left hand end formed with cam teeth, as at $s^4$. The sleeve is keyed on the shaft $s^5$, so as to turn therewith, but may move longitudinally thereon against the spring $s^3$. Mounted loosely on the shaft $s^5$ with the sleeve $s^2$ is a second sleeve $s^6$, held from longitudinal movement to the left, formed with cam teeth $s^7$ to correspond to the cam teeth $s^4$ of the sleeve $s^2$ and provided also with radially projecting lugs $s^8$. The sleeve $s^6$ is carried by a chain wheel $s^9$, driven by a chain $s^{10}$ from a chain wheel $s^{11}$ of the shaft $f^2$. An electromagnet $t$, connected on one side to the source of electricity and to the terminal $b^{13}$ and on the other side to the bottom $b^2$ of the container $b$, has its armature $t'$ mounted on a swinging stop $t^2$. When the last blank $a$ has been taken from the container $b$ and the projection $b^{12}$ of the bottom $b^2$ makes contact with the terminal $b^{13}$, the magnet $t$ is energized and the stop $t^2$ is swung into the path of the radial lugs $s^8$ on the sleeve $s^6$, thereby stopping the rotation of the sleeve $s^6$. As this sleeve cannot move longitudinally and as the sleeve $s^2$, while free to move longitudinally against the pressure of the spring, is keyed on the shaft $s^5$ so as to rotate therewith, the stopping of the sleeve $s^6$ compels movement of the sleeve $s^4$ to the right and the shifting of the belt from the fast pulley to the loose pulley, thereby bringing the entire mechanism to rest.

It will be observed that the mechanism is readily capable of adjustment to suit different sizes and shapes of blanks and that containers of different sizes and shapes, to suit different blanks, may be substituted, one for another, in the same machine or shifted in position according to the curvature of the edges to be stitched.

As has been indicated hereinbefore, the handling apparatus is capable of application to handling of many different articles and may be varied in details of construction and arrangement to suit varied conditions of use without departing from the spirit of the invention so far as the same is covered by the claims.

Certain features of the machine herein disclosed and not claimed form the subject matter of a divisional application filed September 16, 1921, Serial No. 501,125.

I claim as my invention:

1. In an apparatus of the character described, the combination of means for supporting a number of articles one upon the other, a pick-up finger to engage the topmost article, means to move the finger with the article engaged in a direction substantially at a right angle to the plane of the article and means to introduce air between the topmost article and the next at a point within the edges thereof to form a film between the topmost article and the next in the vicinity of the pick-up finger and substantially co-extensive with the article.

2. In an apparatus of the character described, the combination of a container for articles placed one upon another, a plunger to support the articles, means to move the plunger with a step-by-step movement, a pick-up finger to engage the topmost article, means to move the finger with the article engaged in a direction substantially at a right angle to the plane of the article and means to introduce air between the topmost article and the next at a point within the edges thereof to form a film between the topmost article and the next in the vicinity of the pick-up finger and substantially co-extensive with the article.

3. In an apparatus of the character described, the combination of a pick-up finger, means to move the finger to and away from the pile of articles to be handled, a header carried with the pick-up finger and provided with hollow needle points to penetrate through the topmost article and a connection from said header to a source of air under pressure.

4. In an apparatus of the character described, the combination of a vacuum pick-up finger, a connection therefrom to a vacuum system, a valve to control the connection to the vacuum system, means to move the finger with the article engaged in a direction substantially at a right angle to the plane of the article, means to introduce air between the topmost article and the next at a point within the edges thereof to form a film between the topmost article and the next in the vicinity of the pick-up finger and substantially co-extensive with the article, a connection from said means to a suroce of air under pressure, a valve to control said last named connection and a cam shaft with cams to control the opening and closing of said valve.

5. In an apparatus of the character described, the combination of a vacuum pick-up finger, a header carried by the vacuum finger near its terminal and provided with hollow needle points, a connection from the pick-up finger to a vacuum system and connection from the header to a source of air under pressure, whereby air may be introduced between the topmost article and the next.

6. In an apparatus of the character described, the combination of a vacuum pick-up finger, a header carried by the vacuum finger near its terminal and provided with hollow needle points, a connection from the pick-up finger to a vacuum system, connections from the header to a source of air under pressure, whereby air may be introduced between the topmost article and the next, and a carrier for said pick-up finger to move the pick-up finger to and from the article and to transport it.

7. In an apparatus of the character described, the combination of means for supporting a stack of blanks, a pick-up finger to engage the topmost blank, and means to introduce a blast of air through the topmost blank to form a film between it and the article beneath it.

8. In an apparatus of the character described, the combination of means for supporting a stack of blanks, a pick-up finger to engage the topmost blank, means for moving the finger towards and from the stack to engage the topmost blank while it is flat on the stack, and means for delivering a blast of air between the top blank and the one beneath it at a point within the edges of the blanks before the blank is lifted from the stack by the finger.

This specification signed this 24th day of August, A. D. 1917.

GEORGE E. MOLYNEUX.